United States Patent [19]

Boeck et al.

[11] Patent Number: 4,622,458

[45] Date of Patent: Nov. 11, 1986

[54] TRAJECTORY ACQUISITION AND MONITORING SYSTEM

[75] Inventors: Hans-Joachim Boeck, Delmenhorst; Jürgen Fryen, Weyhe; Ulrich Meyer, Lilienthal, all of Fed. Rep. of Germany

[73] Assignee: Messerschmitt-Boelkow-Blohm GmbH, Bremen, Fed. Rep. of Germany

[21] Appl. No.: 555,827

[22] Filed: Nov. 28, 1983

[30] Foreign Application Priority Data

Nov. 30, 1982 [DE] Fed. Rep. of Germany ....... 3244255

[51] Int. Cl.$^4$ .............................................. G01J 1/20
[52] U.S. Cl. .................................... 250/203 R; 356/1
[58] Field of Search .................. 250/203 R; 356/1, 4, 356/152; 455/617; 340/345, 346

[56] References Cited

U.S. PATENT DOCUMENTS 3,931,515 1/1976 Parkin ............................. 250/203 R
4,047,816 9/1977 Pell et al. ........................ 250/203 R Primary Examiner—David C. Nelms
Assistant Examiner—James G. Gatto
Attorney, Agent, or Firm—Ralf H. Siegemund

[57] ABSTRACT

The system includes a plurality of mobile optical-electronic data acquisition stations for individual training on particular mobile targets. These stations are linked through an information exchange and distribution system with a common center cooperating with these stations in a real time configuration for purposes of generating data representing the trajectory of one or more targets on which the optical-electronic acquisition stations are trained.

7 Claims, 4 Drawing Figures

TRAJECTORY ACQUISITION AND MONITORING SYSTEM

BACKGROUND OF THE INVENTION

The present invention relates to a trajectory acquisition and monitoring system which is to be responsive to the trajectory of mobile objects for purposes of acquiring data being indicative of the trajectory and being further amenable to evaluation of such data.

For purposes of evaluating trajectories along which objects move it is necessary to first acquire data on these trajectories by means of measurements carried out within a suitable coordinate system and being related to the position of such object, the progressive change of such position and, more generally, to track the measuring process. It is generally known to use radar for such trajectory acquisition process but is also known that the acquisition of trajectory data by means of radar is not completely satisfactory. The objects to be tracked may be flying objects, such as airplanes, rockets, missiles or the like, or they may float on or in water, or they may move across the land. In order to track these objects and to acquire their trajectory for purposes of progress evaluation it is necessary, usually, to acquire measuring data by means of different, i.e. differently located stations. This is basically the method of a triangulation. It is apparent, however, that trajectory acquisition on that basis requires synchronic control of the several tracking stations so that these have to be linked in an unambiguous fashion.

In addition to radar equipment, trajectory acquisition systems are known for operating basically on an optical basis such as video system or laser systems. The known systems along this line, however, have not yielded satisfactory results, particularly because tracking fast-moving objects such as aircraft or approaching missiles is quite difficult.

DESCRIPTION OF THE INVENTION

It is an object of the present invention to provide a new and improved trajectory acquisition and monitoring system which is capable of tracking moving objects independently from weather conditions and to follow the objects at any speed; the system, furthermore, should be capable of evaluating the acquired trajectory data.

In accordance with the preferred embodiment of the present invention it is suggested to provide several autonomous, spacially distributed and essentially automatic track control stations which are provided with optronic sensors for the immediate acquisition of objects and tracking thereof and that the several mobile stations are linked to a center and among each other through an information distributing and linking system operating on a real time basis.

The features set forth above permit the acquisition and tracking of objects as well as an evaluation of these trajectories on a real time basis. The system permits tracking even closely spaced objects through triangulation carried out in real time also, events of a short duration can be acquired, such as a take-off, an impact or a trigger operation. Objects having been acquired on that basis can be tracked very accurately even at great heights but also in low and very low heights such as an ocean area. The real time operation permits evaluation during, for example, a test run or immediately thereafter. This offers the advantage that test data as well as operating data are available immediately with very little expenditure in equipment. Moreover, this latter fact entails the advantage that the results of such immediate monitoring and testing operation as well as the immediate evaluation of real time operations can be taken into consideration during immediately following missions.

The several stations may be provided with a multiple sensor system wherein the several sensors differ in kind so that under different circumstances and conditions the one can be selected that promises to yield optimum results. This way one obtains an acquisition and tracking of object under utilization of equipment that is a best fit for purposes of tracking a particular kind of object and is also a best fit for purposes of the specific mission as well as weather and other environmental conditions.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following descirption taken in connection with the accompanying drawings in which:

Figure 1:
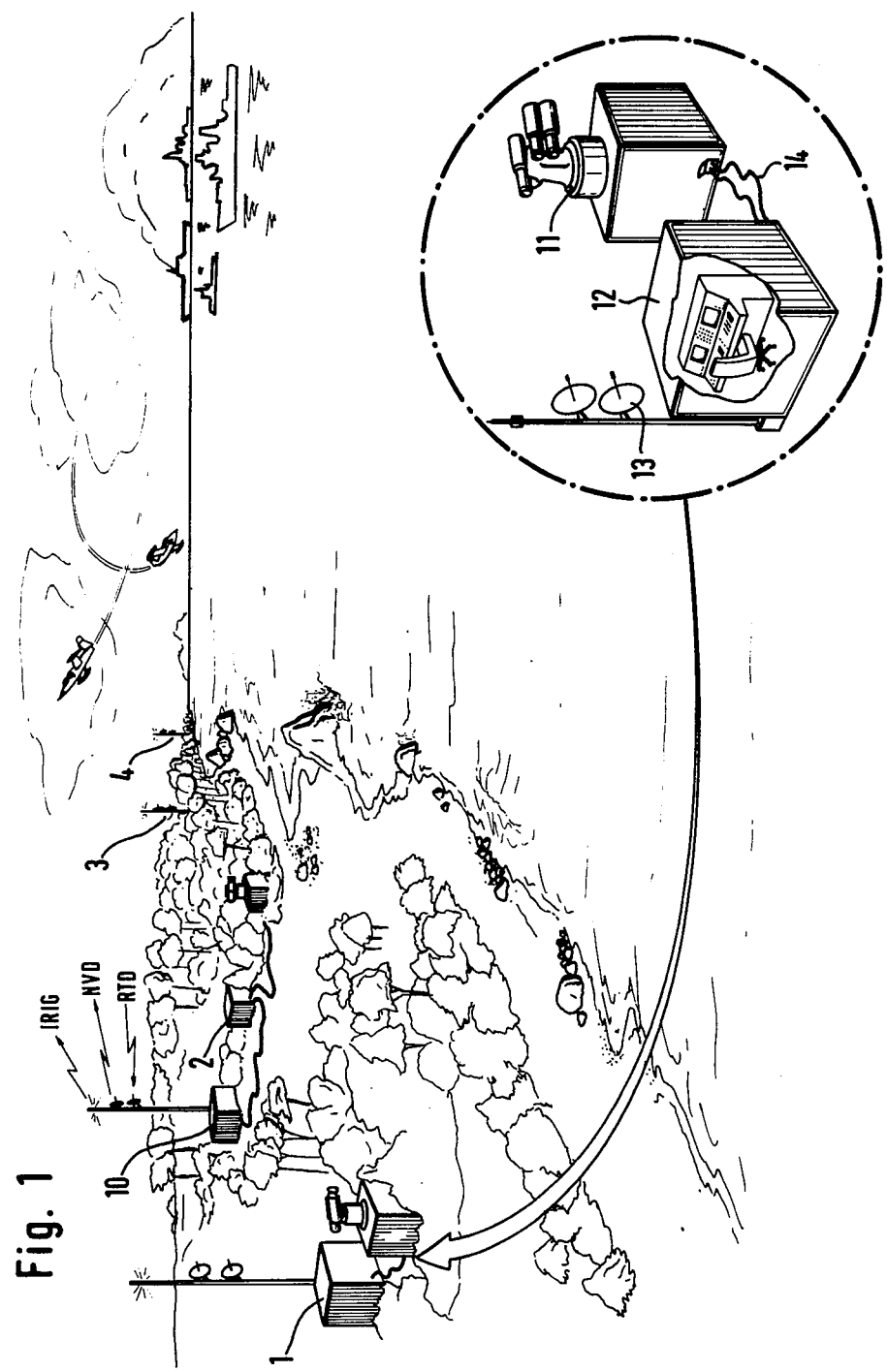
FIG. 1 is a overview of a tracking and monitoring system as it can be used and being arranged and organized in accordance with the preferred embodiment of the present invention for practicing the best mode thereof.

Proceeding now to the detailed description of the drawings, reference is made first to FIG. 1 which illustrates a plurality of track control stations 1, 2, 3 and 4 to be described in greater detail shortly. The system furthermore includes a tracking control center 10 being located in a strategic position in relation to these several individual stations 1, 2, 3 and 4 and being linked thereto through a suitable information distribution system to be described also in detail below.

As far as the individual tracking control stations are concerned, they are basically comprised of an instrument carrier 11 and a control and guidance unit 12, the two units being innerconnected through a cable 14. An antenna system 13 for each of these stations constitutes, in fact, a portion of the information link between the respective station and the control center 10. The control center moreover permits communication of the several track control stations with each other. The manually operated console and terminal unit 12 provides for control, particularly operational control, of the instrument carrier 11 whereby the position of the instrumentation included in the unit 11 is acquired through suitable sensors and feedback, and control circuits provide for close loop position control of the instrumentation under command through the follower control principle provided by and through the console 12. The instrumentation of primary interest on the carrier 11 includes optronic (optical-electronic) sensors to be described in greater detail below.

One can consider the two units 11 and 12 as being the central elements of a single track control station (1, 2, 3 or 4) and these units may be placed, for example, onto a truck through a suitable container in which these units 11 and 12 are inserted. The truck or a trailer such as 15 and 16 respectively of FIG. 2 may be provided for transporting these units.

Figure 2:
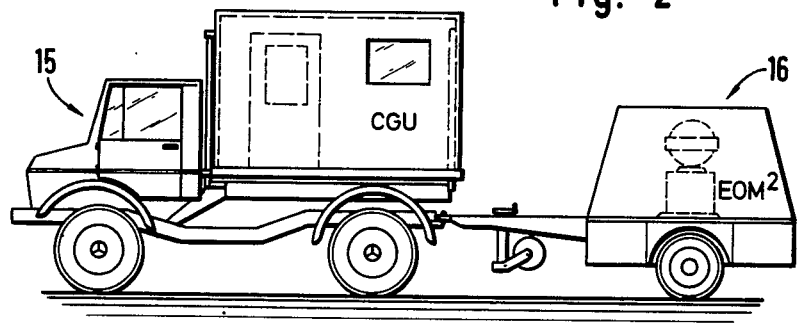
FIG. 2 is an example of a mobile tracking control station.

FIG. 1 illustrates the several units in a stationary disposition but they are not, normally at least, affixed thereto but have been placed into position by means of the mobile equipment shown in FIG. 2. In principle it was not necessary that the units even be unloaded. They may be operated right on a platform, for example, of a vehicle. The tracking operations will normally not be carried out in that fashion but is mentioned here only for purposes of emphasizing that the individual track control stations are, in fact, mobile ones, and temporary stationary disposition does not change this aspect or any feature of the system as a whole.

Figure 3:
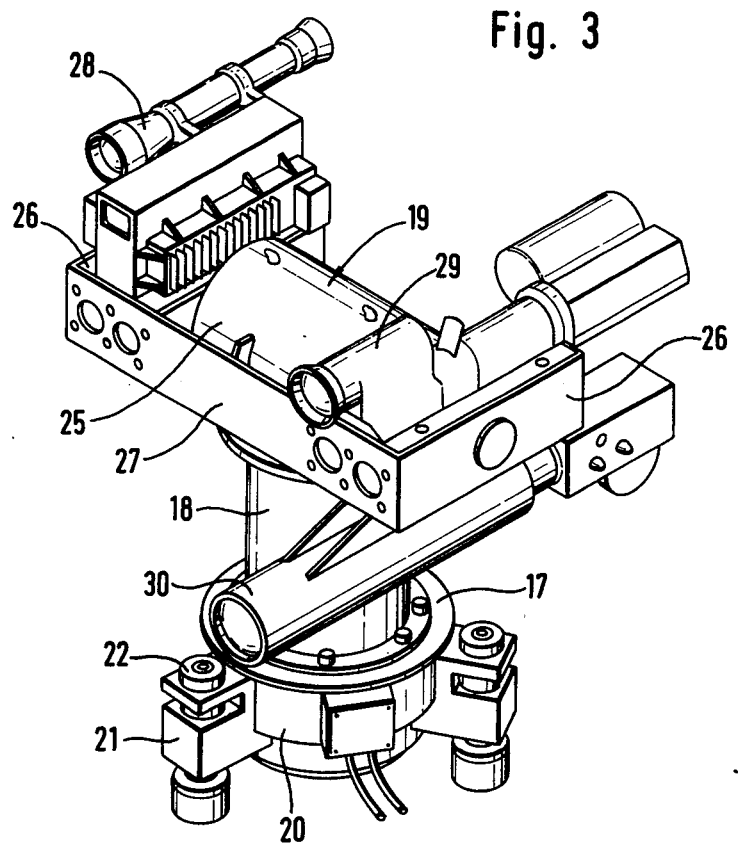
FIG. 3 is a prospective view of an object area that is included in the equipment shown in FIGS. 1 and 2.

Turning now to FIG. 3, this Figure illustrates in greater detail an instrument carrier 11. The Figure particularly illustrates that this carrier 11 is basically composed from three separable modules or groups. A first unit functions primarily as a stand and can be described as the azimuth unit 17. This azimuth unit supports a platform or support unit 18 which in turn supports the third unit, an elevation measuring unit 19.

The azimuth unit 17 is basically comprised of a closed mounting case 20 with three support feet 21 which are arranged in a star-shaped pattern and are provided with adjustment equipment and elements 22 primarily for purposes of levelling. A drive motor, a tachometer type generating bearing, and azimuth angle encoding equipment are included within the mounting of bearing casing 20 which is sealed by means of a lip ring in a low friction fashion. The encoding equipment is provided for a hollow shaft so as to orient the equipment as a whole in a particular azimuth angle and direction. This azimuthal orientation involves particularly the optronics sensors 28 etc. arranged on and being part of the elevational unit 19.

The hollow shaft (not shown, inside tubular stand 18) is mounted and journaled in a bearing which has a high degree of stiffness. This hollow shaft moreover is a duct through which the cable are run for connecting the elevational unit 19 to external equipment. It may be of advantage to flange the drive motor and the encoding device directly upon the hollow shaft.

The tubular mount 18 is slipped on top and over the hollow shaft and is preferably constructed from thin wall tubing made of a weather proof material. Generally speaking, this stand or frame 18 has to be protected against environmental interference such as very strong solar radiation, moisture and the like. Depending upon the operational requirements, the frame or mount 18, and here particularly the hollow shaft therein may be provided for optional exchange to accommodate stands of different length. In this regard, it is feasible to provide individual tubular elements with plane parallel cut and polished flange connections for purposes of assembly and a suitable length. A high degree of accuracy is required here so that any interchange will not pose any problem with regard to the relationship to the azimuthal units 17 on one hand and the elevational measuring unit 19 on the other hand.

The elevational unit 19 is mounted on top of the stand or frame 18 and includes an elevational mounting stand 25 in which is mounted a horizontal shaft with directly interconnected motor, tachometer type generator and angular encoding means. These encoding means are, for example, suitable markings of high accuracy and precise angular spacing, for being scanned optically, electronically or the like for purposes of determining the angular position and displacement in between positions of that shaft. The encoder inside cap 20 is analogously constructed.

Fitting plates are mounted on the elevation mount 25. They are arranged among each other as well as in relation to the stand 18. Moreover, these fitting plates are mounted at the side ends of the mount 25. This feature is provided as a constant maintenance feature for maintaining accuracy of the various parts in relation to each other, particularly if they have to be exchanged. In addition, sensor carriers 26 are secured to the two end faces of the elevational shaft which carriers 26 are bridge-like interconnected by means of a bar 27. The several sensor mounts 26 receive plugged in sensors of the optronic, i.e. optical-electronic variety, 28, 29 and 30. These sensors provide output signals which are fed into cable and ultimately are passed to the control unit 12 pertaining to that particular station.

These electronic-optical sensors are in addition provided with features controlling operational parameters and signals are provided from the control unit 12 through suitable cable and conductors in order to obtain particular values of these parameters. For example, these equipment and components may provide focusing, gray value level, polarity, contrast, spectral filtering, etc. in order to provide directly the requisite operational parameters for these sensors so that they indeed are able to acquire trajectory data. In addition the control unit 12 controls the position and orientation of the optical electronic sensors 28, 29 and 30, which means that through suitable motors the azimuth unit 17 turns the hollow shaft in frame 18 to thereby orient the sensors in a particular horizontal direction. Other control signals are provided for the motor in the unit 19 for purposes of adjusting the elevation, i.e. the angle of the sensor with respect to the horizontal plane. Additional cable of course are run from the unit 12 to the unit 11 for purposes of power supply.

It can thus be seen that each control unit 12 is basically equipped with electronic units and elements for purposes of controlling the instrument carrier 11 generally and the sensors in particular. The control functions are all those needed to orient these sensors towards a particular target and to optimize the optical acquisition of such an object that is to be tracked.

Each control station 12 or the center 10 or both may be provided with computing and calculating facilities in order to process all these operational and acquisitioned data as far as the unit 11 is concerned. The processing and calculating functions may also be distributed to provide, for example, the unit 12 with certain minimum calculating facilities having to do, for example, with formatting so as to limit the linkage requirements and the data flow between the individual stations 12 and the center 10.

The various sensors are, therefore, completely controlled by the associated unit 12, and here particularly by the electronic equipment that is included in the unit 12. This control involves not only the operational aspects but also the follow up equipment for monitoring, tracking, as well as testing the operationality of the individual pieces and calibration thereof. As can be seen, particularly from FIG. 1, each console 12 is provided with a keyboard, a monitoring screens and indicating instruments. The console as stated may also include some or all computing and calculating facilities for processing the acquired data so that the unit 12, in fact, may yield a stream of signals indicative of the angles defining a direction of the object being tracked. In addition there may be a printer provided which provides a local printout of the acquired data and/or of the immediate sensor data.

Each unit 12 will be additionally equipped with electronic control equipment for manual or automatic tracking of the acquired object. The acquisition is, in fact, an optical one in that the object is within the field of view of the respective sensor, and an image thereof may appear on the video screen. The operator may simply track the object by keeping the sensor trained on the object but the same function can also be provided for automatically. The orientation data of the sensors are then immediate and direct indications for elevational and azimuthal tracking. The data so acquired will now be evaluated in accordance with the desired purpose of the acquisition.

The electronic equipment of the unit 12, but also the electronic equipment of control center 10, are synchronized in respect to each other and operate in phase, but are responsive to the occurence of individual events. Therefore, it is possible to acquire immediately specific events such as the take off or other modes of starting a vehicle or any impact of the tracked vehicle or any release and/or triggering that is observable. Such event controlled data processing will be provided on a long term basis in dependence upon highly accurate timing. This means that each unit 12 is provided with a highly accurate local clock or with a clock which is synchronized with a master clock of center 10 through a sequence of pulses recurring at a highly constant rate. This way any event observed with regard to the acquired object can be timed and marked in time and such information immediately available wherever needed.

An event controlled data processing is in principle capable of tracking quasi-continuous events which are then tracked by and in themselves. The information distribution and linking system 12, 13 provides for example suitable information on such continuous events to all control units 12. This information orginates, for example, in one particular unit 12 which passes this information on to the center 10 from which it is distributed to the other units. Basically, the linking and distribution system may involve satellite communication if the distances are too long or if a direct line of vision is not available for reasons of mountains or the like.

The electronic equipment of the control units 12 as well as of the control center 10 is of such nature that the information is passed between them through the information distribution and linking system 13 in terms of information packages, i.e. the data, for example, are compressed in each of the units 12, encoded and transmitted as a burst. Aside from the radio link, for example, of the microwave variety one may use coaxial cables or light transmitting fibers.

Figure 4:
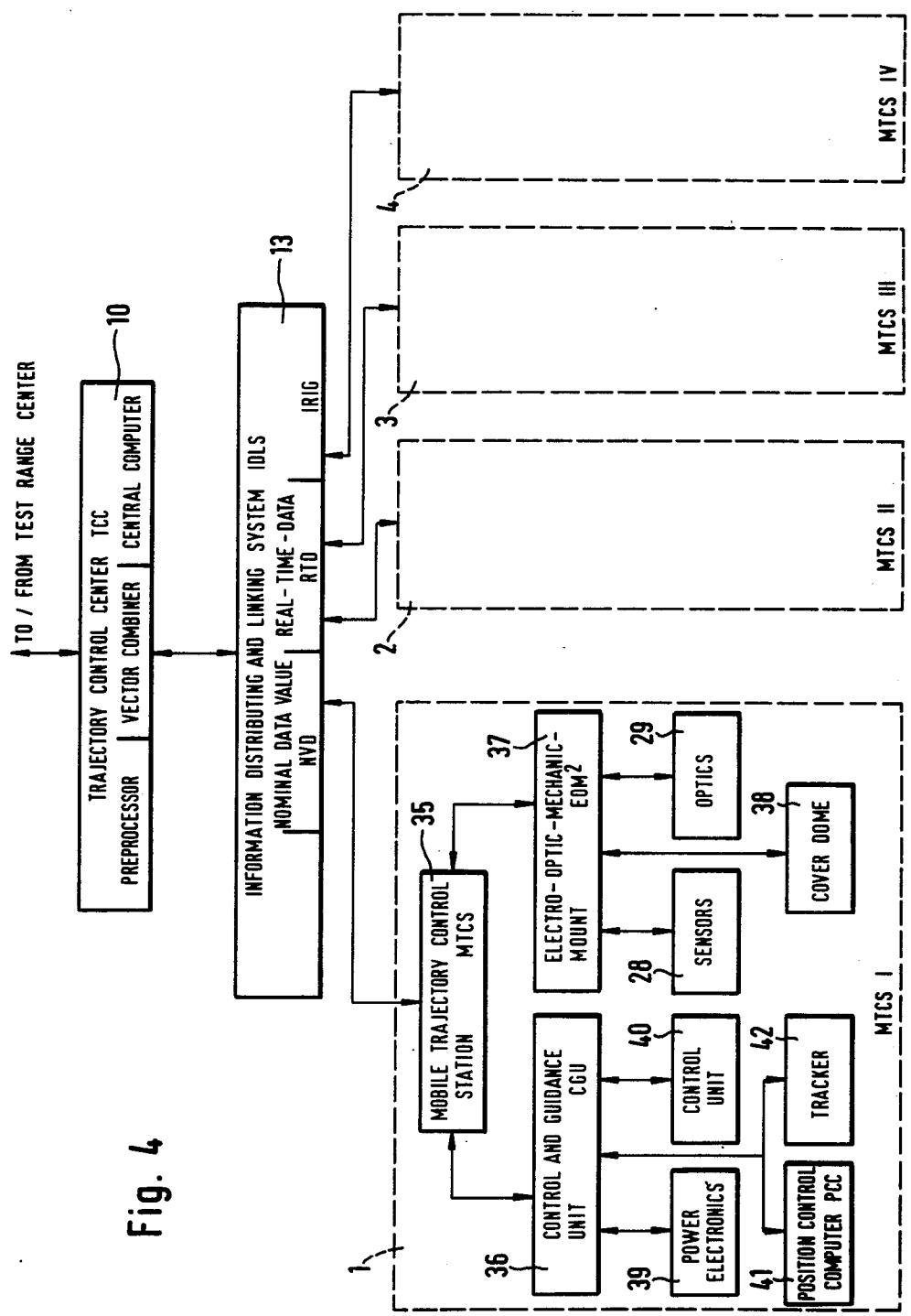
FIG. 4 is a block diagram for the operation carried out by means of the tracking and monitoring system shown in the preceding figures.

FIG. 4 illustrates somewhat schematically and in a block diagram fashion the communication linkage provided as a whole. In this particular example, it is assumed that the control center 10 provides a central computing facility which so to speak provides the ultimate output of the system. The central computing facility cooperates with a preprocessor and a vector combiner. The vector combiner is in immediate linkage to the information distribution system 13 and provides thereto and receives therefrom all the requisite data which the center 10 requires. The preprocessor is, in effect, a processing facility that responds to the stream of data coming in and, for example, unpackages the data, changes the format and provides the data for further use by the central computer facility. The latter combines the orientational and directional data from each station 1, 2 etc. and tracks the targets.

As stated, the information distributing and linking system 13 links the center 10 with the several individual stations 1, 2, 3 and 4. Of course, the number is arbitrary. These stations receive information from the central station 10 and provide information thereto. Generally speaking, one can classify this information into nominal information (NVD), real time information (RGD), such as current azimuth and elavational data. The center may return information concerning anticipated tragectories so that the target can be followed more easily. Additionally, timing information (IRIG) is provided for purposes of synchronizing the operation of all stations in relation to each other as well as in relation to the central computing facility in center 10.

Each station 1-4 includes a transmitter/receiver 35 which is in two-way communication with a control and guidance unit 36 but also independently thereof with the electro-optic mechanic mount 37, which in turn runs the signals to the optical sensor units 28 and 29 and possibly another unit 30 which is not illustrated in FIG. 4. The interface unit 37 in addition controls, for example, a cover 38 which covers the entire carrier and sensors of the unit 11. A guiding and control unit 36 controls the power supply 39 as well as the control unit 40 providing, for example, the operating parameters for the sensing units 28, 29 and 30. In addition a tracking unit 42 is controlled here which in effect includes all those components which orient the sensors. In other words tracker 42 controls azimuth and elevation in carrier 1 and unit 41 is included as a position control computer which provides, for example, the requisite control functions for purposes of local feedback action of the carrier 11 to remain trained on the target. The output of tracker 42 is the primary information output provided to center 10.

In view of the overall organization and by virtue of the linkage among the various stains, the tracking proper and the acquisition of the trajectory is carried out in the control center 10. The basis for this is a multistation tracking without measuring distances to the target. Therefore,the acquisition follows the principle of triangulation which requires that the distance between any two control stations is known or established on a running basis.

The acquired position and trajectory data as far as their immediate content is concerned is of the video variety. The trajectory data proper of course results from the orientation of the optical sensors, by tracker 42. These data are immediately available and therefore can be processed in real time. Multiple sensors are, for example, desired in case one needs a different video spectrum such as infra-red. Moreover, the sensing does not have to be limited to the passive acquisition of available light or other radiaton but the unit 11 may include a transmitter beam by means of which the target is illuminated so that it in turn can be acquired optically. The optical electronic sensors 28, 29 and 30 may all or individually be associated with movie cameras which in dependence upon the occurence of unusual events are additionally turned on in order to acquire information on a more permanent basis.

The information that is provided by the individual stations 1-4 is distributed by means of the distribution system and received by the control center in terms of information packages. This information is processed in this center 10 and dependent upon the particular task the central computer will process this information. To some extent this information is returned to the individual control station. That particular information is then used to provide for particular remote control features which are triggered by the respective unit 12 and carried out by the instrument carrier 11. In this regard, it should be realized that the particular tracking system as described may be supported additionally by auxiliary equipment such as initial radar or telemetric information, precalculated tracking data, direction finders of the like. This information may be, for example, come generally from a test range center and is received by the center 10 for purposes of initial orientation and preparation of the system. In other words, the individual control stations may be preoriented in the direction of an expected object to be tracked so that as soon as it comes within the range and potential field of view it can be acquired without delay. Moreover, the control center may provide some form of rapid evaluation of the acquired data by means of an off-line process.

The invention is not limited to the embodiments described above but all changes and modifications thereof not constituting departures from the spirit and scope of the invention are intended to be included.

We claim:

1. A trajectory acquiring and tracking system comprising, a plurality of several autonomous, spatially separated and mobile track control stations each including a plurality of passive optical electronical sensors operating in different ranges of the electromagnetic spectrum and acquiring information received from an object or objects in real time, for object acquisition as a target and target tracking;

each track control station including an instrument carrier being adjustable automatically for elevation and azimuthal orientation and carrying the respective sensors pertaining to that station;

a control center provided for real time operation and coordination as well as triangulation on the basis of acquired position and tracking data; and an information linking and distribution system coupling the control stations of the plurality to the control center for bi-directional data communication.

2. A system as in claim 1 wherein each station includes a control unit with a monitor operating for optical acquisition of information provided by the respective sensor being operated in real time synchronization with a control center.

3. A system as in claim 1 wherein each track control station includes means for recording visually acquired information.

4. A system as in claim 1 wherein each instrument carrier is mounted on a stand for azimuthal orientation and includes rotational means for elevational adjustment of the instruments thereon.

5. A system as in claim 1 wherein each track control station includes a stationary case with motor driven adjustment shaft extending in vertical direction and an instrument carrier on that shaft and including a motor driven shaft for elevational adjustment of the instruments thereon.

6. A system as in claim 5 wherein angular encoding means are included in order to provide representation of the angular adjustment as far as elevation as well as azimuth is concerned.

7. A system as in claim 1 wherein the linking and the distribution system includes wireless connection or coaxial cable or light transmitting fibers.

* * * * *